July 1, 1930.  W. T. TRUAX  1,769,322
DOUBLE WALL PIPE
Filed Jan. 25, 1928
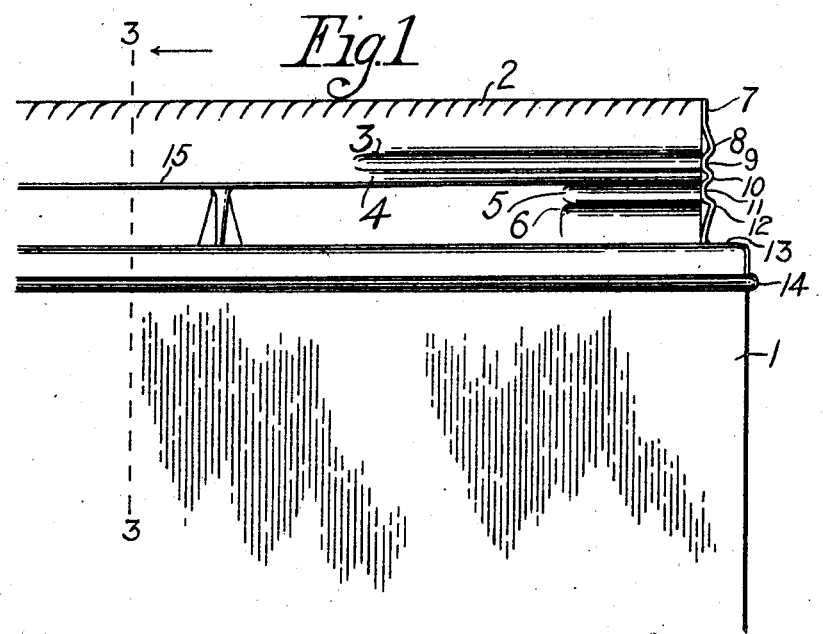
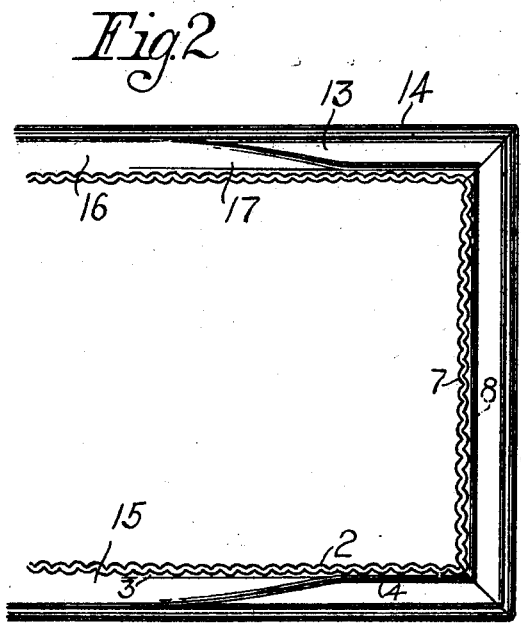
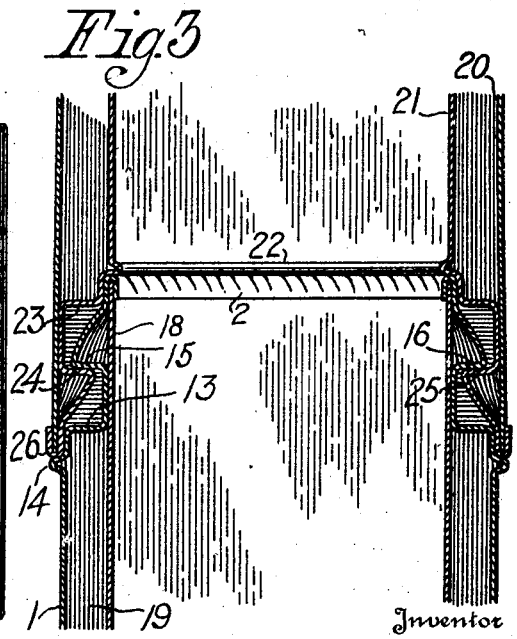
Inventor
William T. Truax,
By Edwin Guthrie,
Attorney Patented July 1, 1930

1,769,322

UNITED STATES PATENT OFFICE

WILLIAM T. TRUAX, OF BATTLE CREEK, MICHIGAN, ASSIGNOR TO UNITED STATES REGISTER CO., OF BATTLE CREEK, MICHIGAN, A CORPORATION OF MICHIGAN

DOUBLE-WALL PIPE

Application filed January 25, 1928. Serial No. 249,380.

This invention relates to double walled hot air pipes that are made in joints or sections and coupled together telescopically the external end portion of one section or piece being received and engaged by the the internal edge portion of the next piece. Such pipes as ordinarily fashioned are in relatively short lengths and are intended to be connected one to another without the use of tools, and to form a hot air conduit of any desired length.

The object of this invention is the production of a piece of double walled pipe of the nature stated which has parts of special construction and arrangement providing a joint easily and quickly connected or disconnected without the use of tools or expert knowledge of the subject, and which will secure the joints of pipe together in such manner as to prevent any loss of warm air and afford a smooth uninterrupted interior channel for the passage of the air.

In the acompanying drawings the special construction and arrangement of the particular parts of this invention are illustrated.

Fig. 1 represents a side view of one end of a piece of double walled pipe formed in accordance with this invention and shows all parts assembled.

Fig. 2 is a top view of the parts set out in Fig. 1.

Fig. 3 is a vertical section on the broken line 3—3 of Fig. 1 showing two pieces of pipe made in accordance with this invention and joined together.

Throughout the drawings and description the same number is used to refer to the same part.

Considering the drawings, each piece of pipe has a plane outer wall 1 and a plane inner wall joined together usually by a crimped edge 2 that bounds the opening of the pipe. Near the crimped edge 2 the wall 1 has a limited area of corrugations 3, 4, 5, 6, adjacent the end 7 which has also coresponding corrugations 8, 9, 10, 11 and 12. It will be understood that the piece or section of pipe illustrated has two ends such as the end 7, and at both ends are found corrugations in nature and extent such as those set forth in Fig. 1. In other words the ends of the piece of pipe are exact duplicates so far as the construction is concerned.

At a distance below the edge 2 will be noted a flat shoulder 13 and this shoulder passes all around the pipe externally. Just below the shoulder is a bead or rounded projection 14, co-extensive with the shoulder.

The sides of the piece of pipe are greater in length than the pipe is wide, usually several times greater, and the customary cross-sectional shape of the pipe is rectangular as illustrated. On each side of the pipe below the edge 2 is formed a projecting inclined lip. The lips are designated by reference numbers 15 and 16. It will be noted in Fig. 2 that the end 17 of the lip 16 diminishes in width towards the end of the pipe and the lip 15 also diminishes in like manner. The ends of the lips are thus formed at both ends of the pipe, and the diminution continues until it meets the corrugations near the end, which corrugations project but slightly beyond the plane of the inset upper portion of the wall 1.

As stated the pipe has a plane inside wall 18, and a suitable non-conducting air space 19 between them.

In Fig. 3 a second section of pipe is shown joined to the first described. The construction is the same as before. There is a plane outer wall 20 and a plane inner wall 21 the edges of which are connected together as stated. Of the second section of pipe it will be noted that the shoulder 23 projects inwardly and that it is the bottom edge of the second section which is illustrated in Fig. 3. As the section of pipe first described has a bottom inner portion of exactly the same construction as the second section it may obviously be coupled with a third section and so on as desired. The shoulder 23 is of like form and extent with the shoulder 13 described, but passed around inside the pipe section instead of externally, and the same may be said of the the projecting lips 24 and 25, which are the same in form as lips 15 and 16. The crimped edge of the second section marked 26 joins the outer and inner walls 20 and 21, just as the walls 1 and 18 are connected. The internal end portions of the second portion of pipe shown in Fig. 3 and the end wall of that section interiorly are provided with corrugations arranged to receive the corrugations of the sides and ends of the first section.

In operation the sections are placed together as shown in Fig. 3. A slight pressure causes the sides of an inner section to bulge or bow inwardly, permitting the lips to pass over each other and to become engaged as set forth. It will be understood that when the sides of the inner section are pressed inwardly towards each other the total area of the interior of the section is reduced and the ends of the section are drawn slightly towards each other. The sides may be readily bowed in the same manner to disconnect the sections. As the lips engage the corrugations also become engaged, and the joint is closed throughout against the escape of warm air from the joined sections of pipe.

Having now described this invention and explained the mode of its operation, I claim:—

1. A piece of double walled pipe comprising a plane outer wall and a plane inner wall spaced apart, said pipe having sides greater in length than the width of the pipe, the edges of said walls being connected together to bound the openings into the interior of the pipe, one of said walls near one of said openings having a part between its ends formed into a projecting inclined lip parallel with the edge of the opening, and the end portions of the lip being gradually diminished in width.

2. A piece of double walled pipe comprising a plane outer wall and a plane inner wall spaced apart, said pipe having sides greater in length than the width of the pipe, the edges of said walls being connected together to bound the openings into the interior of the pipe, one of said walls near one of said openings having a part between its ends formed into a projecting inclined lip parallel with the edge of the opening, the end portions of the lip being gradually diminished in width, and the said wall being formed into a shoulder adjacent to the said lip and extending from said inner to said outer wall.

3. A piece of double walled pipe comprising a plane outer wall and a plane inner wall spaced apart, said pipe having sides greater in length than the width of the pipe, the edges of said walls being connected together to bound the openings into the interior of the pipe, one of said walls near one of said openings having a part between its ends formed into a projecting inclined lip parallel with the edge of the opening, the end portions of the lip being gradually diminished in width, the said wall being formed with a shoulder adjacent to the said lip and extending from said inner to said outer wall, and the said wall having a bead substantially co-extensive in length with the shoulder and formed adjacent to the shoulder.

4. A piece of double walled pipe comprising a plane outer wall and a plane inner wall spaced apart, said pipe having sides greater in length than the width of the pipe, the edges of said walls being connected together to bound the openings into the interior of the pipe, one of said walls near one of said openings having a part between its ends formed into a projecting inclined lip parallel with the edge of the opening, the said wall having near its end a portion provided with corrugations, and the end portion of the said lip being diminished in width to meet said corrugations.

In testimony whereof I affix my signature.

WILLIAM T. TRUAX.